United States Patent Office 3,393,191
Patented July 16, 1968

3,393,191
MONOAZO DYES IN WHICH THE COUPLING COMPONENT IS A 1-AMINO-3-CYANO BENZENE RADICAL
Curt Mueller, Basel, Switzerland, assignor to Sandoz Ltd. (also known as Sandoz A.G.), Basel, Switzerland
No Drawing. Filed Feb. 19, 1965, Ser. No. 434,097
Claims priority, application Switzerland, Feb. 25, 1964, 2,263/64
8 Claims. (Cl. 260—205)

ABSTRACT OF THE DISCLOSURE

Azo dyes free from carboxylic acid and sulphonic acid groups and having a para-amino-ortho-cyanophenyl azo group build up excellently on textile materials made of fully synthetic or semi-synthetic hydrophobic high-molecular organic substances when applied from aqueous dispersion.

---

This invention relates to new azo dyes of the formula

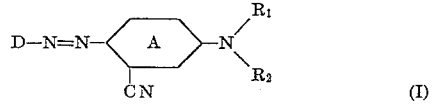

(I)

wherein D represents the radical of a diazo component, $R_1$ and $R_2$ represent identical or different if desired substituted alkyl radicals, and in which the ring A may bear further substituents. Preferably the dyes are free from water-solubilizing groups, notably from carboxylic acid and sulphonic acid groups. The process for the production of these dyes comprises diazotation of an amine of formula $$D—NH_2 \quad (II)$$

and coupling of the diazotised amine with a compound of formula

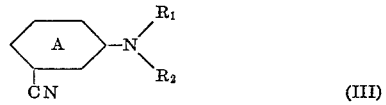

(III)

The amines of Formula II are generally aromatic or heterocyclic. Examples of suitable amines are those of the benzene, naphthalene, azobenzene and benzene-azo-naphthalene series, or preferably aminobenzenes in which the ring is substituted by one or two identical or different halogen atoms, in particular chlorine or bromine atoms, or by cyano, nitro, alkylsulphonyl, arylsuphonyl, alkyl carbonyl, aryl carbonyl, carboxylic acid ester, carboxylic acid amide, sulphonic acid amide or acylamino groups. Of the heterocyclic compounds, there preferred are 2-aminothiazoles which may contain as substituents, e.g., nitro, cyano or alkylsulphonyl groups, or the 2-aminobenzothiazoles or 2-aminothiophenes.

The benzene nucleus A in the coupling component of Formula III may bear any desired substituents, but here also non-water-solubilizing groups are preferred. The nitrogen atom may be a constituent of a heterocycle which may in turn contain further hetero atoms.

Especially suitable coupling components are those of the formula

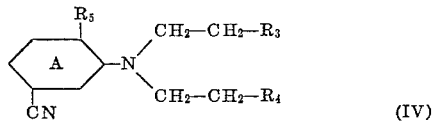

(IV)

wherein $R_3$ and $R_4$ each represent a hydrogen atom, a halogen atom primarily chlorine or bromine, a hydroxyl, alkoxy or acyloxy group, in particular an alkylcarbonyloxy or alkyloxycarbonyl group, or a cyano group, and $R_5$ represents a hydrogen atom, a halogen atom, primarily chlorine or bromine, or an alkyl or alkoxy group.

Preferably $R_3$ and $R_4$ both stand for hydrogen, chlorine, hydroxyl, acetoxy, propionyloxy, methoxycarbonyl, ethoxycarbonyl or cyano and $R_5$ for hydrogen, methyl, ethyl, methoxy or ethoxy.

The preferred dyes have the formula

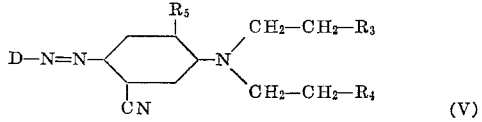

(V)

wherein D represents the radical of a diazo component free from acid dissociating groups and belonging to the benzene, naphthalene, 2-thiazole, 2-benzothiazole or 2-thienyl series, $R_3$ and $R_4$ both represent hydrogen, chlorine, hydroxyl, acetoxy, propionyloxy, methoxycarbonyl, ethoxycarbonyl or cyano and $R_5$ represents hydrogen, methyl, ethyl, methoxy or ethoxy.

By acid dissociating groups are understood sulphonic acid and carboxylic acid groups.

The coupling reaction is carried out preferably in an acid, if necessary buffered, medium with cooling, e.g. in the temperature range 0–5° C.

The dyes obtained are new. It is of special advantage to convert dyes free from water-solubilizing groups into dye preparations before use. For this purpose they are comminuted until the average particle size is approximately 0.01 to 10 microns or more especially about 0.1 to 5 microns. Comminution can be carried out in the presence of dispersing agents or fillers. For example, the dried dye can be ground with a dispersing agent and if necessary fillers, or alternatively kneaded in paste form with a dispersing agent, and subsequently vacuum or jet dried.

For dyeing the dye addition can be about 20 grams to 80 grams per liter; in padding it may be up to 150 grams per liter but preferably 0.1 to 100 grams is used; in printing up to about 150 grams dye per kilogram printing paste can be used. The liquor ratio can vary within wide limits, e.g. 1:3 to 1:200 or preferably 1:3 to 1:80.

Applied from aqueous dispersion, the dyes build up excellently on textile materials made of fully synthetic or semi-synthetic hydrophobic high-molecular organic substances. They are especially suitable for the dyeing, padding and printing of filaments, fibers, tops, knitted goods and woven fabrics of linear aromatic polyesters, secondary cellulose acetate, or cellulose triacetate. Synthetic polyamides, polyolefins and acrylonitrile polymerisation products also can be dyed with them. Dyeings of especially high quality are obtained on linear aromatic polyesters. These are generally polycondensation products of terephthalic acid and glycols, notably ethylene glycol, and are sold under various registered trade names, among which may be mentioned "Terylene," "Diolen," "Dacron" and "Kodel."

The known dyeing methods are used for the dyes. Polyester fibers can be dyed in the presence of carriers at temperatures from about 80° to 125° C. or in the absence of carriers at about 100° to 140° C. under pressure by the exhaustion process. The dyes can be padded on these fibers from aqueous dispersion or printed with an aqueous paste, and fixed at temperatures between 140° and 230° C., e.g. with the aid of water vapor or air. In the optimum temperature range 180° to 220° C. the dyes diffuse rapidly into polyester fiber and do not sublime even when the fiber is exposed to these high temperatures for some length of time. This eliminates inconvenient contamination of the fixing plant by sublimed dye. Secondary cellulose acetate is dyed preferably at temperatures between about 65° and 80° C. and cellulose triacetate at temperatures up to about 115° C. The optimum pH range is 2 to 9 or more particularly 4 to 8.

Generally the normal dispersing agents are used, preferably those of the anionic or non-ionic types, or alternatively a mixture of such dispersing agents. Often an addition of about 0.5 gram dispersing agent per liter of the dyebath or padding liquor is sufficient, though larger amounts can be used, e.g. up to about 3 grams per liter. Amounts in excess of 5 grams per liter do not usually offer advantages. Known anionic dispersing agents which can be chosen for use in the process are, for example, the condensation products of naphthalenesulphonic acids and formaldehyde, notably dinaphthylmethane disulphonates, the esters of sulphonated succinic acid, Turkey red oil, the alkali salts of sulphuric acid esters of fatty alcohols, e.g. sodium lauryl sulphate and sodium cetyl sulphate, sulphite cellulose waste liquor and its alkaline salts, soaps, or the alkali metal sulphates or the monoglycerides of fatty acids. Examples of known and especially suitable non-ionic dispersing agents are the addition products of approximately 3–40 moles of ethylene oxide and alkyl phenols, fatty alcohols or fatty amines, and their neutral sulphuric acid esters.

In padding and printing the normal thickening agents are used, e.g. unmodified or modified natural products such as sodium alginate, British gum, gum Arabic, crystal gum, locust bean gum, gum tragacanth, carboxymethyl cellulose, hydroxyethyl cellulose, starches, or synthetic products such as polyacrylamide or polyvinyl alcohol.

The dyeings obtained are of yellow, orange, brown, red or violet shade and extremely fast, e.g., to thermofixation, sublimation, pleating, gas fumes, cross dyeing, dry cleaning, chlorine, water, washing, perspiration and other wet tests. The dischargeability and the reserve of wool and cotton is good. The light fastness is excellent even in pale shades so that the dyes are highly suitable as components for the production of fashionable pastel shades. They are stable to reduction effects at temperatures up to at least 220° C. and especially at 80–140° C. This stability is not adversely affected either by the liquor ratio or by the presence of dyeing accelerants.

The new dyes are also valuable pigments for the mass coloration of plastics, rubber, natural or synthetic resins and of solutions of these mostly high-molecular substances, and they can also be used for printing plastic films and sheets, textiles, leather and paper.

In the examples the parts and percentages are by weight and the temperatures in degrees centigrade.

Example 1

6.9 parts of powdered sodium nitrite are added slowly with stirring at 60–70° to 150 parts of concentrated sulphuric acid. Stirring is continued for 10 minutes at 60°, then after cooling to 0° 19.7 parts of 1-amino-2-chloro-4-nitro-6-cyanobenzene are added and stirring resumed for 2 hours. The resulting diazonium salt solution is run into a cold mixture of 17.4 parts of 1-N,N-diethylamino-3-cyanobenzene, 20 parts of concentrated sulphuric acid, 20 parts of ice and 10 parts of aminosulphonic acid. The coupling reaction is brought to an end in an acid medium at 0° which may be buffered if necessary. The resulting dye is filtered off, washed free of acid and dried. After recrystallisation once from an acetone-alcohol mixture it melts at 186–187°. It dyes synthetic fibers in bluish red shades with good fastness properties.

Example 2

A mixture of 60 parts of water, 40 parts of concentrated hydrochloric acid and 17.2 parts of 1-amino-2-chloro-4-nitrobenzene is stirred for 3 hours at room temperature, then cooled with 100 parts of ice and diazotized in 2 hours at 0–5° with a solution of 6.9 parts of sodium nitrite and 30 parts of water. After stirring for a further 15 minutes 10 parts of aminosulphonic acid are added. The diazonium salt solution is then filtered clear and added to a mixture of 20.6 parts of 1-N,N-di-(2'-hydroxyethyl)-amino-3-cyanobenzene, 100 parts of water, 20 parts of concentrated hydrochloric acid and 200 parts of ice. The coupling reaction is brought to a close at 0–5° in buffered medium. The dye formed is filtered off, washed free of acid and dried. On recrystallization from chlorobenzene the pure dye melts at 204°. It dyes synthetic fibers in red shades.

Example 3

A mixture of 60 parts of water, 40 parts of concentrated hydrochloric acid and 17.2 parts of 1-amino-2-chloro-4-nitrobenzene is stirred for 3 hours at room temperature, then cooled with 100 parts of ice and diazotized in 2 hours at 0–5° with a solution of 6.9 parts of sodium nitrite in 30 parts of water. After subsequent stirring for 15 minutes 10 parts of aminosulphonic acid are added to the diazonium salt solution, which is then filtered clear and added to a mixture of 29 parts of 1-N,N-di-(acetoxyethyl)-amino-3-cyanobenzene, 50 parts of glacial acetic acid and 100 parts of ice. The coupling reaction is completed in buffered medium. The dye formed is filtered off, washed with water and dried. After recrystallization once from an alcohol-acetone mixture in the ratio 4:3 the pure dye melts at 168°. It dyes synthetic fibers in reddish orange shades having good fastness properties.

Example 4

6.9 parts of powdered sodium nitrite are added at 60–70° with vigorous stirring to 120 parts of concentrated sulphuric acid. Stirring is continued for 10 minutes at 60°, then after cooling to 10° 100 parts of glacial acetic acid are added at 10–20°, followed by 16.3 parts of 2-amino-5-nitrobenzonitrile and a further 100 parts of glacial acetic acid. After a further 2 hours' stirring the resulting diazonium salt solution is run into a mixture of 19 parts of 1-N-ethyl-N,β-hydroxyethyl-amino-3-cyanobenzene, 100 parts of glacial acetic acid, 150 parts of ice and 10 parts of aminosulphonic acid. The coupling reaction is brought to an end in buffered medium. The dye obtained is filtered off, washed free of acid, dried and recrystallized from acetone. The pure dye melts at 213–214°. It dyes synthetic fibers in brilliant violet shades with good fastness properties.

Example 5

To 150 parts of concentrated sulphuric acid are added at 60–70° with vigorous stirring 6.9 parts of finely divided sodium nitrite. After 10 minutes 20.5 parts of 1-amino-2-chloro-4-methylsulphonylbenzene are added. Stirring is continued for 1 hour at 60°, after which the reaction mixture is cooled to 0°. Excess nitrite is destroyed by the addition of 8 parts of urea. The diazonium salt solution obtained is poured into a mixture of 19 parts of 1-N-ethyl-N,β-hydroxyethyl-amino-3-cyanobenzene, 100 parts of glacial acetic acid and 200 parts of ice. The coupling reaction is brought to completion at 0° in buffered medium, on which the dye obtained is filtered off, washed free of acid with water and dried. Recrystallization from alcohol gives the pure dye with melting point 203–204°. It dyes synthetic fibers in orange shades with good fastness properties.

Example 6

6.9 parts of powdered sodium nitrite are added at 60–70° with vigorous stirring to 150 parts of concentrated sulphuric acid. Stirring is continued for 10 minutes at 60–70°, and after cooling to 0° 24.2 parts of 2-amino-3-bromo-5-nitrobenzonitrile are added. Stirring is resumed for 2 hours, after which the diazonium salt solution formed is run into a cold mixture of 23.2 parts of 1-N-ethyl - N,β - acetoxyethyl-amino-3-cyanobenzene, 50 parts of glacial acetic acid, 150 parts of ice and 10 parts of aminosulphonic acid. The coupling reaction is brought to completion at 0° in acid medium. The dye formed is filtered off, washed with water until free of acid and dried. On recrystallization from alcohol the pure dye melts at 180–181°. It dyes synthetic fibers in violet shades.

Example 7

6.9 parts of powdered sodium nitrite are added at 60–70° with good stirring to 120 parts of concentrated sulphuric acid, with subsequent stirring for 10 minutes at 60° and cooling to 10°. At 10–20° 100 parts of glacial acetic acid are added, followed by 21.6 parts of 1-amino-2-methylsulphonyl-4-nitro-benzene and 100 parts of glacial acetic acid. Stirring is continued for 2 hours at 10–20°, then 8 parts of urea are added. After 10 minutes the di-azonium salt solution is poured into a mixture of 19 parts of 1-N-ethyl-N,β-hydroxyethyl-amino-3-cyanobenzene, 100 parts of glacial acetic acid and 200 parts of ice. The coupling reaction is brought to a close at 0° in buffered medium, and the dye obtained is filtered off, washed with water until free of acid and dried. The dry dye melts at 211–212°.

The dye is dissolved in 200 parts of acetic anhydride, the solution stirred for 30 minutes at 130–132° and then run into 2000 parts of water at 70°. The dye 2-methyl-sulphonyl-4-nitro - 2' - cyan-4'-(N-ethyl-N-β-acetoxyethyl-amino) - 1,1' - azobenzene is precipitated in crystalline form. On recrystallization from chlorobenzene the dye melts at 169–170°. It dyes synthetic fibers in rubine shades having good fastness properties.

The dyes listed in the following table are produced in accordance with the procedure of Example 1 starting from a diazotized amine of Formula II and a compound of Formula IV.

TABLE

| Ex. No. | D | $R_3$ | $R_4$ | $R_5$ | Shade on polyester fiber |
|---|---|---|---|---|---|
| 8 | 2-cyano-4-nitrophenyl | H | H | H | Red. |
| 9 | 2-chloro-4-nitrophenyl | H | H | H | Red. |
| 10 | 2-bromo-4-nitrophenyl | H | H | H | Red. |
| 11 | 4-nitrophenyl | H | H | H | Scarlet. |
| 12 | 2,6-dichloro-4-nitrophenyl | H | H | H | Red-brown. |
| 13 | 2,6-dibromo-4-nitrophenyl | H | H | H | Do. |
| 14 | 2-chloro-4-nitro-6-bromo-phenyl | H | H | H | Do. |
| 15 | 2-cyano-4-nitrophenyl | H | H | H | Bluish red. |
| 16 | do | OH | OH | H | Do. |
| 17 | 2-bromo-4-nitrophenyl | OH | OH | H | Red. |
| 18 | 4-ethoxycarbonylphenyl | OH | OH | $C_2H_5$ | Red. |
| 19 | 4-methylsulphonylphenyl | OH | OH | H | Red. |
| 20 | 4-acetylaminophenyl | OH | OH | H | Scarlet. |
| 21 | 2,5-dicyano-phenyl | OH | OH | H | Do. |
| 22 | 2,5-dichloro-phenyl | OH | OH | H | Do. |
| 23 | 2-cyano-4-nitrophenyl | —O—CO—CH₃ | —O—CO—CH₃ | H | Red. |
| 24 | 2-bromo-4-nitrophenyl | —O—CO—CH₃ | —O—CO—CH₃ | H | Red. |
| 25 | do | —O—CO—CH | —O—CO—CH₃ | CH₃ | Red. |
| 26 | 4-nitrophenyl | —O—CO—CH₃ | —O—CO—CH₃ | H | Scarlet. |
| 27 | 2,6-dichloro-4-nitrophenyl | —O—CO—CH₃ | —O—CO—CH₃ | H | Brown. |
| 28 | 2,6-dibromo-4-nitrophenyl | —O—CO—C₂H₅ | —O—CO—C₂H₅ | H | Do. |
| 29 | 2-chloro-4-nitro-6-bromo-phenyl | —O—CO—C₂H₅ | —O—CO—C₂H₅ | H | Do. |
| 30 | 2,5-dichloro-phenyl | —O—CO—CH₃ | —O—CO—CH₃ | H | Orange. |
| 31 | 2-methylsulphonyl-4-nitrophenyl | —O—CO—CH₃ | —O—CO—CH₃ | H | Red. |
| 32 | 5-nitrothiazolyl-2- | —O—CO—CH₃ | —O—CO—CH₃ | H | Red. |
| 33 | 5-cyanothiazolyl-2- | —O—CO—CH₃ | —O—CO—CH₃ | H | Red. |
| 34 | 4-methylsulphonylnaphthyl-1- | CN | OH | H | Yellowish red. |
| 35 | 6-nitrobenzothiazolyl-2- | CN | OH | CH₃ | Red. |
| 36 | 6-methylsulphonylbenzothiazolyl-2- | CN | OH | —O—C₂H₅ | Red. |
| 37 | 3-nitro-5-acetylthienyl-2- | CN | OH | H | Red. |
| 38 | 4-nitro-3'-methoxy-1,1'-azobenzene-4'- | CN | OH | H | Bordeaux. |
| 39 | 2-chloro-4-nitrophenyl | OH | H | H | Red. |
| 40 | 2-bromo-4-nitrophenyl | OH | H | H | Reddish violet. |
| 41 | 2-methylsulphonyl-4-nitrophenyl | OH | H | H | Do. |
| 42 | 2-chloro-5-methylsulphonylphenyl | OH | H | H | Orange. |
| 43 | 2-bromo-4,6-dinitrophenyl | OH | H | H | Violet. |
| 44 | 2-bromo-4-nitro-6-cyanophenyl | OH | H | H | Bluish violet. |
| 45 | 2-chloro-4-nitrophenyl | —O—CO—CH₃ | H | H | Scarlet. |
| 46 | 2,5-dichloro-4-nitrophenyl | —O—CO—CH₃ | H | H | Do. |
| 47 | 2-cyano-4-nitrophenyl | —O—CO—CH₃ | H | H | Rubine. |
| 48 | 2-methylsulphonyl-4-nitro-6-chloro-phenyl | —O—CO—CH₃ | H | H | Bordeaux. |
| 49 | 2-chloro-4-methylsulphonylphenyl | —O—CO—CH₃ | H | H | Yellowish orange. |
| 50 | 2-bromo-4,6-dinitrophenyl | —O—CO—CH₃ | H | H | Bordeaux. |
| 51 | 2-chloro-4-nitrophenyl | —CO—O—CH₃ | H | H | Scarlet. |
| 52 | 4-ethoxycarbonylphenyl | —O—CO—CH₃ | H | H | Reddish yellow. |
| 53 | 4',5'-dimethoxy-2'-methyl-1,1'-azobenzene-4- | —O—CO—CH₃ | H | H | Orange. |
| 54 | 6-methoxybenzothiazolyl-2- | —O—CO—CH₃ | H | H | Red. |
| 55 | 2-chloro-4-cyanophenyl | —O—CO—CH₃ | H | H | Orange. |
| 56 | 2-cyano-5-chlorophenyl | —O—CO—CH₃ | H | H | Do. |
| 57 | 4-dimethylaminosulphonylamino-phenyl | —O—CO—CH₃ | H | H | Do. |
| 58 | 4-aminosulphonylphenyl | —O—CO—CH₃ | H | —OCH₃ | Do. |
| 59 | 3-methylaminosulphonylphenyl | —O—CO—CH₃ | H | H | Do. |
| 60 | 4-methylaminocarbonylphenyl | —CO—O—CH₃ | —CO—O—CH₃ | H | Do. |
| 61 | do | —CO—O—C₂H₅ | —CO—O—C₂H₅ | H | Do. |
| 62 | 4-acetoxyphenyl | —O—CO—CH₃ | H | H | Do. |
| 63 | 4-methylsulphonylnaphthyl-1- | —O—CO—CH₃ | H | H | Scarlet. |
| 64 | 2,5-di-(methoxycarbonyl)-phenyl | —O—CO—CH₃ | H | H | Orange. |
| 65 | 2,4-dinitrophenyl | —O—CO—CH₃ | CN | H | Rubine. |
| 66 | 2-chloro-4-nitrophenyl | CN | H | H | Red. |
| 67 | 4-acetylphenyl | —O—CO—C₂H₅ | H | H | Orange. |
| 68 | 4-chloro-3-nitrophenyl | —O—CO—C₂H₅ | H | H | Do. |
| 69 | 2-chloro-4-methylsulphonyl-phenyl | OH | OH | H | Violet. |
| 70 | 2,6-dichloro-4-dimethylaminosulphonyl-phenyl | OH | OH | H | Orange. |
| 71 | 2,5-dichloro-4-dimethylaminosulphonyl-phenyl | OH | OH | H | Scarlet. |
| 72 | 2,4-dinitrophenyl | Cl | Cl | H | Red. |
| 73 | do | H | Cl | H | Red. |
| 74 | do | H | —OCH₃ | H | Red. |
| 75 | 4-ethylsulphonyl-phenyl | H | H | H | Red. |
| 76 | 6-methylsulphonyl-benzothiazolyl-2- | —O—COCH₃ | —OCOCH₃ | H | Red. |
| 77 | 6-dimethylaminosulphonyl-benzothiazolyl-2- | —O—COHC₃ | —OCOCH₃ | H | Red. |
| 78 | 6-methylsulphonyl-benzothiazolyl-2- | CN | CN | —OCH₃ | Red. |
| 79 | 4-dimethylaminocarbonyl-phenyl | OH | OH | H | Orange. |
| 80 | 4-methylcarbonyl-phenyl | OH | OH | H | Do. |

Dyeing example

A mixture of 7 parts of the dye obtained according to Example 1, 4 parts of sodium dinaphthylmethane disulphonate, 4 parts of sodium cetyl sulphate and 5 parts of anhydrous sodium sulphate is ground for 48 hours in a ball mill to give a fine powder. 2 parts of this powder are dispersed in 300 parts of water containing 3 parts of a 30% solution of a highly sulphonated castor oil and 20 parts of an emulsion of a chlorinated benzene. 100 parts of a fabric of "Dacron" (registered trademark) polyester fiber are entered into the dyebath at 20–25°, upon which the bath temperature is increased to 95–100° in about 30 minutes and dyeing continued for 1 hour at this temperature. The fabric is then removed from the bath, rinsed, soaped for 15 minutes at 70° with a 0.1% solution of an alkylphenyl polyglycol ether, rinsed again and dried. A rubine dyeing with good fastness properties is obtained.

The same results are obtained in the absence of carrier when dyeing is carried out in a high-temperature machine at 120–130°.

Having thus disclosed the invention what is claimed is:

1. An azo dye of the formula

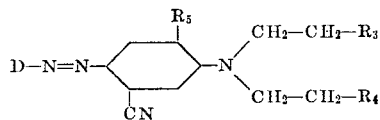

wherein

D is a diazo component radical from the group consisting of a phenyl, naphthyl, 2-thiazolyl, 2-benzthiazolyl and 2-thiophenyl radical and which is free from carboxylic acid and sulphonic acid groups;

each of $R_3$ and $R_4$ is a member selected from the group consisting of hydrogen, chlorine, hydroxyl, acetoxy, propionyloxy, methoxycarbonyl, ethoxycarbonyl and cyano; and $R_5$ is a member selected from the group consisting of hydrogen, methyl, ethyl, methoxy and ethoxy.

2. Azo dye of the formula

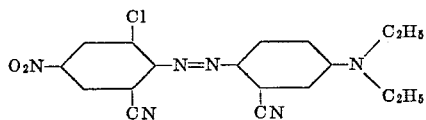

3. Azo dye of the formula

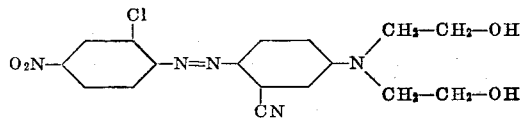

4. Azo dye of the formula

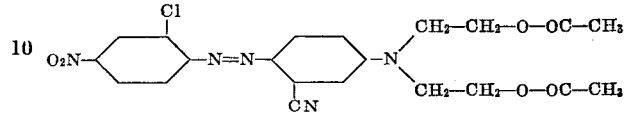

5. Azo dye of the formula

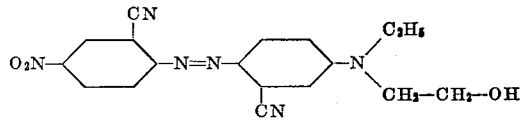

6. Azo dye of the formula

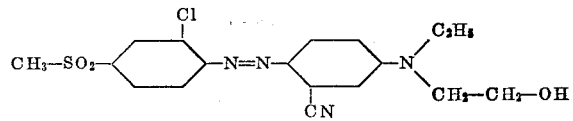

7. Azo dye of the formula

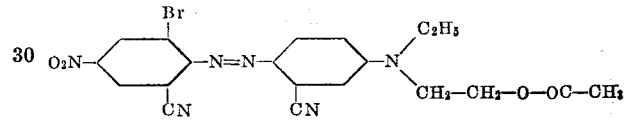

8. Azo dye of the formula

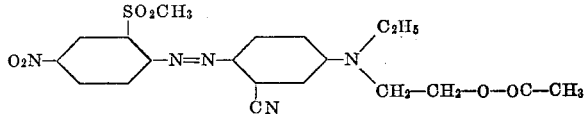

References Cited

UNITED STATES PATENTS

| | | | |
|---|---|---|---|
| 1,978,763 | 10/1934 | Reddelien et al. | 260—205 X |
| 2,082,156 | 6/1937 | Felix et al. | 260—205 |
| 2,173,417 | 9/1939 | Huber | 260—205 X |
| 2,475,228 | 7/1949 | Felix et al. | 260—205 |
| 2,830,043 | 4/1958 | Merian | 260—205 X |
| 2,873,270 | 2/1959 | Merian | 260—205 |
| 2,955,901 | 10/1960 | Kruckenberg | 260—205 X |
| 2,967,858 | 1/1961 | Merian et al. | 260—205 |

FLOYD D. HIGEL, *Primary Examiner.*